(12) United States Patent
Howie (10) Patent No.: US 8,532,384 B2
(45) Date of Patent: Sep. 10, 2013

(54) METHOD OF RETRIEVING INFORMATION FROM A DIGITAL IMAGE

(76) Inventor: Cameron Telfer Howie, Newlands (ZA)

( * ) Notice: Subject to any disclaimer, the term of this patent is extended or adjusted under 35 U.S.C. 154(b) by 935 days.

(21) Appl. No.: 12/515,498

(22) PCT Filed: Nov. 21, 2007

(86) PCT No.: PCT/ZA2007/000079
§ 371 (c)(1),
(2), (4) Date: Jun. 9, 2009

(87) PCT Pub. No.: WO2008/064378
PCT Pub. Date: May 29, 2008

(65) Prior Publication Data
US 2010/0061634 A1      Mar. 11, 2010

(30) Foreign Application Priority Data
Nov. 21, 2006    (ZA) .................................. 2006/9664

(51) Int. Cl.
*G06K 9/34*   (2006.01)
(52) U.S. Cl.
USPC ........................................ 382/176; 382/180

(58) Field of Classification Search
USPC .......................................... 382/173, 176, 180
See application file for complete search history.

(56) References Cited

U.S. PATENT DOCUMENTS

| | | | |
|---|---|---|---|
| 6,768,816 B2 * | 7/2004 | Hall et al. | 382/229 |
| 7,275,063 B2 * | 9/2007 | Horn | 1/1 |
| 2003/0152277 A1 | 8/2003 | Hall | |
| 2008/0021921 A1 * | 1/2008 | Horn | 707/102 |

FOREIGN PATENT DOCUMENTS

EP    0 465 818    1/1992

* cited by examiner

*Primary Examiner* — Bernard Krasnic
(74) *Attorney, Agent, or Firm* — David R. Heckadon; Gordon Rees, LLP (57) ABSTRACT

The method includes segmenting a document image to identify image objects within the document image and applying an automatic algorithm to the image objects so as to assign initial metadata to the image objects. The method further includes selecting image objects from the set of image objects whose metadata satisfy filtration criteria so as to exclude those selected image objects from processing and processing a rest of the image objects in the set of image objects. The method further includes presenting the document image, image objects, and metadata to the user and enabling input from the user to manage the image objects, subsets, and metadata.

20 Claims, 5 Drawing Sheets

METHOD OF RETRIEVING INFORMATION FROM A DIGITAL IMAGE

CROSS REFERENCE TO RELATED APPLICATIONS

This application claims priority from International Patent Application Number PCT/ZA2007/000079 filed on 21 Nov. 2007 which claims priority from South Africa Patent Application No. ZA/2006/9664 filed on 21 Nov. 2006.

TECHNICAL FIELD

The invention relates to a method of retrieving information from a digital image.

In particular, the invention relates to a method of enabling a user to retrieve information from a digital image, to a system for retrieving information from a digital image and to a digital information-carrying device including digital information arranged to enable a method of retrieving information from a digital image.

The invention relates to interactive tagging of content in digital images. The invention further relates to electronically processing, or analysing, document images. In particular, the invention relates to text and object recognition techniques for tagging content, such as, inserting bookmarks, or the like, for example, within document images. More particularly, the present invention relates to electronic tagging of content within documents converted, or scanned, into a digital image format.

BACKGROUND OF THE INVENTION

Certain professional people often need to sift through large quantities of paper documentation in order to trace significant content. For example, a person may have to sift through boxes of paper documents looking for a few key words pertinent to a task at hand. With modern computer systems, it is possible to use search techniques to locate such content. Typically, use is made of an appropriate data structure containing metadata for supporting searching.

By metadata is meant data associated with data. For example, metadata can include, for example, a 'postal code' for an integer; a 'title word' for a word in a text title, a rectangle identifying an object's location on a page, a bitmap representing a word object in a digital image, features derived from a bitmap object, or the like. Metadata can typically be generated by interpretation and administration needs, such as programmatic needs.

To obtain metadata from non-electronic documents, such as, paper documents, or documents on microfiche, or the like, for example, such documents are typically converted, or captured, into a suitable digital format to provide a document image. This can typically be achieved by using an appropriate scanning device. After the documents have been converted into a digital format, a computer-based text recognition process, or system, can be used to provide a digital interpretation of objects found within the document image. An example of such a text recognition process is Optical Character Recognition (OCR). Conventionally, the digital interpretation can be output in the form of computer readable 'character codes' which are assigned to individual image objects within the document image. Examples of such codes are ASCII, EBCDIC and Unicode, for example. Typically, such codes are output in electronic files that can be viewed and managed within applications, such as a word processor program, or the like, for example. Examples of processes for capturing document images and applying text recognition to such captured document images are discussed below.

In U.S. Pat. No. 4,985,863 ("Document storage and retrieval system"), images are processed by a text recognition system that outputs character codes in such a way that characters, where recognition may be in error, have alternative code choices. Accordingly, provision is made for a search and retrieval system to locate content that is potentially ambiguous. For example, the recognition process might confuse the letter 'l' with the digit '1'. In such a case, the word "full" might be interpreted and output as "fu[l1][l1]" where the ambiguous characters are grouped within "[ ]" to signal multiple interpretations. Such an output could be retrieved by the keyword "full", or the keyword "ful1", for example. A similar approach is described in U.S. Pat. No. 5,905,811 ("System for indexing document images"). U.S. Pat. No. 6,480,838 ("System and method for searching electronic documents created with optical character recognition") also discloses an invention dealing with recognition errors when retrieving textual content.

In U.S. Pat. No. 5,109,439 ("Mass document storage and retrieval system"), document images are run through a text recognition process during which search words are identified automatically and put into a table to facilitate later search and retrieval within the document images. The identification of such words is done using simple language-specific heuristics and there is no interaction with a user. Furthermore, an indexing process disclosed in this patent does not use metadata based on a bitmap appearance of the words (only text recognition output codes), nor does it group items in the document image into subsets of the same, or similar words, as they occur in the document image. The invention disclosed is designed for applications such as, mail processing, for example, and does not provide for an interactive approach to searching like that of the present invention.

U.S. Pat. No. 5,706,365 ("System and method for portable document indexing using n-gram word decomposition") describes an invention for constructing an index for a batch of documents on which a text recognition process has been performed. Not all of the documents input to the system need to be in image form. For example, some of the documents may already contain character code metadata. The index is based on n-grams and is designed so as to provide for correction of text recognition errors and to be small enough for porting to multiple other computer systems.

In U.S. Pat. No. 6,768,816 ("Method and system for interactive ground-truthing of document images"), an index is constructed to speed up ground-truthing of document images. Typically, ground-truthing includes user-input to teach a computer and can be performed before, or after, machine recognition of information is performed. For example, ground-truthing can be used to teach a computer to recognize certain things. A set of ground-truthed things is input to a computer pattern recognition program so as to cause the computer to recognize specific things. In another example, a computer has been used for recognition and a user then goes through associated results so as to correct errors in interpretation. The invention, in particular, provides for an index, which addresses error correction in text recognition processes. It is constructed by grouping image objects into subsets based on features like the bitmap shapes of the letters, such as, for example, all instances of the letter 't' in Times Roman font might be grouped together. If such instances were erroneously recognised by the text recognition method used, a user can apply a single correction command, which then takes effect over the entire subset of instances.

In spite of the teachings of the above inventions, the process of error correction can still be relatively time consuming. Many service professionals do not request that third party service bureaus, providing the capability of capturing paper documents into electronic form, perform such corrections.

With regard to the present invention, it appears to the Applicant that the most relevant prior art seems to be that disclosed in U.S. Pat. No. 6,768,816. However, a significant limitation of this disclosure is that an index is not constructed 'online'. Furthermore, the index is designed for ground-truthing entire documents into a full-text output result. A major disadvantage of such an approach is that users working with large batches of documents would need to wait until the entire index is constructed before they could begin searching for content. Furthermore, the index gets clogged with all image objects in the document image. Typically, most of the image objects are not of interest to the user.

Online construction, such as in the present invention, permits the user to begin working with initial documents already indexed, while simultaneously providing feedback to an index construction process, thereby to cause image objects of non-interest to be ignored from subsequent documents during the indexing process. In this way, the indexing process can be speeded up and space can be saved. This can be very advantageous and enables, for example, a legal professional to commence working on initially scanned documents of a large batch of documents, so as to index and tag, or bookmark, information in the documents, while a personal assistant is scanning the rest of the batch of documents into a computer system. In addition, the present invention introduces 'content filtering' for greatly improved index performance, both in terms of construction speed and storage space.

The Applicant believes that existing art for capturing documents and identifying, or tagging, content therein, possibly incorporating some form of manual error correction, is inefficient for several reasons:

Firstly, professional persons, who typically work with large volumes of paper documents, currently often outsource the scanning and text recognition processes of the paper documents to third parties. Typically, such third parties do not participate in identification and management of textual content. For example, a scanning bureau that digitises paper documents for an attorney, for example, is typically unable to determine which objects in an associated document image would be of interest to the attorney. Accordingly, it would be inefficient to have the bureau personnel perform error correction on the full-text output of the text recognition process since, typically, only a small part of the full-text may be of interest to the attorney. Therefore, to perform error correction on the full textual content may not be unnecessary. However, if such error correction is not performed, the attorney may not be able accurately to locate content where the interpretation output of a text recognition process includes erroneous interpretation of image objects.

Secondly, outsourcing the capture of paper documents into an electronic format can result in delays since, typically, the end user would not have access to the documents until the third party has returned them. Furthermore, outsourcing document capture and content book marking typically forces an 'offline' approach to document capture and content book marking. Accordingly, the benefits of an 'online' approach in document capture and content book marking, can typically not be employed when document capture is outsourced. Furthermore, in some cases, it may not be prudent to outsource document capture, since such documents may be confidential.

Thirdly, resultant electronic files as returned to the end user are typically not indexed for querying the document image for content by, for example, a keyword search, or the like. A common approach is to return to the user a collection of files in, for example, Adobe™ Portable Document Format (PDF) ™, or the like, in which the files comprise the document image and text recognition codes against which keyword queries may be performed. Typically, actual construction of an index across such a file collection, would require the end user to employ additional resources, such as, a special program designed to construct an index of text within a batch of PDF files, for example. This typically involves additional computational overhead to construct such an index.

Fourthly, text recognition applications used to capture documents are typically not included within a program used to display the documents and to provide a search interface to the user. It would be advantageous if a single application could be provided which provides for text recognition when capturing documents, displaying associated document images to a user and which provides a search interface to the user.

It is an object of the invention to provide a solution arranged to at least alleviate the problems mentioned above.

It is an object of the invention to provide a process arranged to enable an end user to provide feedback while constructing an index directly from source documents during an indexing process.

Advantageously, the invention provides an 'online' approach during conversion, or capturing, of documents. Accordingly, the process is arranged to inhibit delays and expense typically associated with 'full-text' capture. Advantageously, the process of the invention is arranged to inhibit having to perform error correction of the full-text of a captured document. Furthermore, the process provides a relatively efficient content identification and tagging process. Text recognition performed on content of interest to the user can be corrected relatively easily and efficiently, by using an index model to propagate a correction over one or multiple error locations. Text recognition errors can also be addressed by using flexible 'fuzzy' search methods.

It is believed that, the efficiency of the process of the invention is so much better than existing methods, that many professional persons could use the invention not only to process a desired batch of documents identified within a larger batch, but also to process the entire larger batch at the outset. For example, large-scale litigation cases by attorneys often require that attorneys examine an initial collection of documents at relatively great time and expense, in order to identify which documents therein are of interest. The documents of interest are then captured into a computer system (usually by a third party service bureau). The entire larger batch is typically not provided to a service bureau since the existing art, typically, makes it too expensive and time consuming to have the entire batch of documents captured. The present invention provides users a relatively efficient way of identifying such documents without the time delay and cost overheads characteristic of methods currently employed.

SUMMARY OF THE INVENTION

According to one aspect of the invention, there is provided a method of enabling a user to retrieve information from a document image, the method including:
   providing the user with digital instructions for:
      segmenting a document image, thereby to define a set of image objects within the document image;

enabling the user to define image objects of no interest to the user so that such objects of no interest are not processed in subsequent processing; and processing the rest of the image objects of the set of image objects to enable the user to retrieve such image objects from the document image when the document image is displayed to the user.

The method may include providing the user with digital instructions for creating machine-readable data structures defining metadata fields linked with associated image objects.

The method may include providing the user with digital instructions for assigning initial metadata to the metadata fields associated with the image objects.

Processing the rest of the image objects may include grouping image objects into a plurality of subsets, wherein each subset includes one or more image objects.

The method may further include providing the user with digital instructions for creating machine-readable data structures defining metadata fields linking together two or more subsets within the plurality of subsets.

The method may further include providing the user with digital instructions for creating machine-readable data structures defining metadata fields linking two or more objects within a subset.

The method may further include providing the user with digital instructions for creating machine-readable data structures defining metadata fields linking two or more objects from different subsets.

The method may further include providing the user with digital instructions for presenting the document image, the set of the image objects and the metadata associated with the image objects, to the user.

The method may further include providing the user with digital instructions for accepting input from the user to manage the image objects, the subsets, and the metadata.

According to another aspect of the invention, there is provided a system for retrieving information from a digital image, the system including the digital instructions mentioned above.

The system may be a computer system.

According to another aspect of the invention, there is provided a digital information-carrying device including the digital instructions mentioned above.

According to yet another aspect of the invention, there is provided a method of enabling a user to retrieve information from a document image, the method including segmenting the document image to identify a set of image objects within the document image, creating machine readable data structures linking the image objects with metadata fields, applying an automatic algorithm to the image objects so as to assign initial metadata to the linked metadata fields, selecting image objects from the set of image objects whose metadata satisfy filtration criteria specified by at least one user, so as to exclude those selected image objects from processing, processing a rest of the image objects in the set of image objects so as to group the rest of the image objects into a plurality of subsets, each subset including one or more image objects, presenting the document image, image objects, and metadata to the at least one user and enabling input from the at least one user so as to manage the image objects, subsets, and metadata.

The method may further include linking reference image objects to corresponding subsets in the plurality of subsets.

Linking reference image objects to corresponding subsets in the plurality of subsets may include selecting image objects from the corresponding subsets to define reference image objects corresponding to the subsets.

Linking reference image objects to corresponding subsets in the plurality of subsets may include constructing reference image objects from image objects in the subsets to define reference image objects corresponding to the subsets.

Presenting the document image, image objects, and metadata to the at least one user may include presenting the reference objects to the at least one user.

Presenting the document image, image objects, and metadata to the at least one user may include presenting the image objects in an order of metadata values as determined by the at least one user.

Presenting the document image, image objects, and metadata to the at least one user may include presenting the image objects in an order of subsets as determined by the at least one user.

The method may further include generating a searchable data structure to represent the document image.

Generating a searchable data structure may include creating machine-readable data structures defining metadata fields linking together two or more subsets within the plurality of subsets.

Generating a searchable data structure may include creating machine-readable data structures defining metadata fields linking together two or more image objects within a subset.

Generating a searchable data structure may include creating machine-readable data structures defining metadata fields linking together two or more image objects from different subsets.

Applying an automatic algorithm to the image objects so as to assign initial metadata to the linked metadata fields may include applying an automatic algorithm in the form of a text recognition algorithm to the image objects so as to assign initial metadata to the linked metadata fields.

Applying an automatic algorithm in the form of a text recognition algorithm to the image objects so as to assign initial metadata to the linked metadata fields may include assigning computer readable representations of words to the image objects as initial metadata.

Enabling input from the at least one user so as to manage the image objects, subsets, and metadata may include enabling input from a plurality of users.

Enabling input from the at least one user so as to manage the image objects, subsets, and metadata may include enabling the at least one user to delete undesired image objects from the data structure.

Enabling input from the at least one user so as to manage the image objects, subsets, and metadata may include enabling the at least one user to vary filtration criteria.

Enabling input from the at least one user so as to manage the image objects, subsets, and metadata may include enabling the at least one user to vary the initial metadata assigned to the linked metadata fields.

Enabling input from the at least one user so as to manage the image objects, subsets, and metadata may include enabling the at least one user interactively to remove an image object from a subset.

Enabling input from the at least one user so as to manage the image objects, subsets, and metadata may include enabling the at least one user interactively to move an image object from one subset to another subset.

Enabling input from the at least one user so as to manage the image objects, subsets, and metadata may include enabling the at least one user interactively to group subsets into sets, each set having linked metadata fields.

Processing a rest of the image objects in the set of image objects so as to group the rest of the image objects into a plurality of subsets may include grouping image objects having similar metadata into subsets.

Processing a rest of the image objects in the set of image objects so as to group the rest of the image objects into a plurality of subsets may include grouping image objects having similar bitmap shapes into subsets.

Presenting the document image, image objects, and metadata to the at least one user may include presenting a document image in the form of a machine-readable file including a bit mapped representation of a document.

Presenting the document image, image objects, and metadata to the at least one user may include presenting a document image in the form of a machine-readable file including a plurality of bit mapped representation documents.

According to another aspect of the invention, there is provided a digital information-carrying device including digital information arranged to enable the method as described above.

According to a further aspect of the invention, there is provided a system for retrieving information from a document image, the system including a user input device, a display, a memory, a document image stored in the memory and information for enabling a user to retrieve information from the document image, the information including instructions for segmenting the document image to identify a set of image objects within the document image, creating machine readable data structures linking the image objects to metadata fields, assigning initial metadata to the metadata fields by means of an automatic algorithm, selecting image objects from the set of image objects whose metadata satisfy filtration criteria as specified by a user, so as to exclude such selected image objects from processing, processing a rest of the image objects in the set of image objects so as to group the rest of the image objects into a plurality of subsets, each subset including one or more image objects, presenting the document image, image objects, and metadata on the display and enabling input by means of the user input device so as to manage the image objects, subsets, and metadata.

The system may further include instructions for linking reference image objects to corresponding subsets.

The system may include instructions for linking reference image objects in the form of image objects selected from the subsets to corresponding subsets to define reference image objects corresponding to the subsets.

The system may include instructions for linking reference image objects in the form of reference image objects constructed from image objects selected from image objects in the subsets to define reference image objects corresponding to the subsets.

The instructions for presenting the document image, image objects, and metadata on the display may include instructions for presenting the reference objects on the display.

The instructions for presenting the document image, image objects, and metadata on the display may include instruction for presenting the image objects on the display in an order of metadata values as determined by the user.

The instructions for presenting the document image, image objects, and metadata on the display may include instructions for presenting the image objects on the display in an order of subsets as determined by the user.

The instructions may further include instructions for generating a searchable data structure representing the document image.

The instructions for generating a searchable data structure representing the document image may include instructions for creating machine-readable data structures defining metadata fields linking together two or more subsets within the plurality of subsets.

The instructions for generating a searchable data structure representing the document image may include instructions for creating machine-readable data structures defining metadata fields linking together two or more image objects within a subset.

The instructions for generating a searchable data structure representing the document image may include instructions for creating machine-readable data structures defining metadata fields linking together two or more image objects from different subsets.

The instructions for assigning initial metadata to each image object by means of an automatic algorithm may include instructions for assigning initial metadata to each image object by means of a text recognition algorithm.

The instructions for assigning initial metadata to each image object by means of a text recognition algorithm may include instructions for assigning computer readable representations of words to the image objects as initial metadata.

The instructions for enabling input by means of the user input device so as to manage the image objects, subsets, and metadata may include instructions for enabling a user to delete undesired image objects from the data structure by means of the user input device.

The instructions for enabling input by means of the user input device so as to manage the image objects, subsets, and metadata may include instructions for enabling a user to vary filtration criteria by means of the user input device.

The instructions for enabling input by means of the user input device so as to manage the image objects, subsets, and metadata may include instructions for enabling a user to vary the initial metadata assigned to the linked metadata fields by means of the user input device.

The instructions for enabling input by means of the user input device so as to manage the image objects, subsets, and metadata may include instructions for enabling a user interactively to remove an image object from a subset by means of the user input device.

The instructions for enabling input by means of the user input device so as to manage the image objects, subsets, and metadata may include instructions for enabling a user interactively to move an image object from one subset to another subset by means of the user input device.

The instructions for enabling input by means of the user input device so as to manage the image objects, subsets, and metadata may include instructions for enabling the user interactively to group subsets into sets, each set having linked metadata fields, by means of the user input device.

The instructions for processing a rest of the image objects in the set of image objects so as to group the rest of the image objects into a plurality of subsets, each subset including one or more image objects may include instructions for grouping image objects having similar metadata into subsets.

The instructions for processing a rest of the image objects in the set of image objects so as to group the rest of the image objects into a plurality of subsets, each subset including one or more image objects may include instructions for grouping image objects having similar bitmap shapes into subsets.

The instructions for presenting the document image, image objects, and metadata on the display may include instructions for presenting a document image in the form of a machine-readable file including a bit mapped representation of a document on the display.

The instructions for presenting the document image, image objects, and metadata on the display may include instructions for presenting a document image in the form of a machine-readable file including a plurality of bit mapped representation documents on the display.

BRIEF DESCRIPTION OF THE DRAWINGS

Embodiments of the invention will now be described, by way of example, with reference to the accompanying diagrammatic drawings, in which.

DETAILED DESCRIPTION OF THE DRAWINGS

The present invention provides a method and a system by which a document image can be processed, or analysed, for the purposes of establishing a searchable data structure arranged to enable searching for, or retrieval of, information in the document image. Typically, the document image is segmented into a set of image objects with linked, or paired, metadata fields.

Typically, image objects are specified regions of a document image that contain a structural element, where examples of such structural elements include, but are not limited to, a single character, a word, a string of characters, a picture, a diagram, and the like, for example. Where the document image includes a bitmap, image objects can include portions of an associated bitmap of textual elements within the document image. Such portions of the associated bitmap can include bitmaps of hand-written structural elements, such as signatures, annotations, and the like, for example.

The image objects are identified and linked with fields for storing metadata. The metadata is used to link, or pair, meaning to image objects in the document image. Examples of such metadata include, but are not limited to, pointers, tags, flags, plain text represented in computer readable code, such as ASCII, EBCDIC, Unicode, and the like, for example. The metadata can be independently searched, retrieved, stored, managed, viewed, highlighted, shared, printed, protected, indexed, edited, extracted, redacted, and the like, for example. Accordingly, metadata can be used by the user to 'bookmark', or tag, and manage, information of interest in the document image.

In one embodiment of the invention, the method of processing, or analysing, a document image is provided which includes segmenting the document image to identify an initial set of image objects within the document image.

Each object is then input to an automatic recognition algorithm, such as, a textual recognition algorithm, such as OCR, or the like, for example. The recognition output for each object is assigned metadata values in fields for that object. In one embodiment of the invention, multiple recognition methods can be used to produce metadata for the objects. Weighted interpretation can then be given to their output values in order to determine the recognition values for objects. For example, a bitmap word object can be input to a word-based recognition algorithm such as that disclosed in U.S. Pat. No. 5,557,689. It can also be input to a character-based method, such as, OCR, or the like, for example.

The invention can use the metadata to perform filtering of objects so as to exclude from further processing those objects whose metadata values satisfy filtration criteria. For example, the user may request that the data structure exclude all objects in the document image which a recognition method has output as punctuation symbols, or English language prepositions, or the like, for example. Text recognition methods typically output confidence values along with the interpreted character codes, said confidence values indicating how accurate the method believes the character codes to be. Accordingly, in another example, the user may wish to exclude all objects that receive textual values of low confidence, perhaps due to poor quality lettering in the document image, or the like, for example. In another example, the user may wish to exclude all common words in a specified language, such as, in the English language, for example. Such words can include words such as, the, and, to, and the like, for example. In yet another example, the user may wish objects excluded if their textual metadata values match one or more text strings in a list of text strings.

Unlike the index constructed in U.S. Pat. No. 6,768,816, which discloses constructing an index for all image objects in the document image to provide a full-text searchable result to a user to enable the user to ground-truth the document image, the present invention enables the user to control, or tailor, the filtering of undesired objects. In a preferred embodiment, this is achieved by using an interactive, 'online' approach. It is believed that this approach improves index construction and usage, in particular, when processing large volumes of documents.

The present invention can be used advantageously for applications where large volumes of documents are to be processed, such as, during preparation for litigation, where an end user knows beforehand which content in the document will be of interest, or the like, for example, by enabling the end user to tailor filtration. Typically, a majority of objects in the document image are unlikely to be of interest to the end user when searching the document image. Typically, in English, for example, words such as "the" and "and" account for roughly 79% of any text, regardless of subjects of discussion, vocabulary, or ways of expression (see Claude E. Shannon, "Prediction and Entropy of Printed English", Bell System Technical Journal, XXX (January, 1951), 50-64, reprinted in Bell Telephone System Technical Publications as Monograph 1819, at 50). Such redundancy of textual patterns is well known to users skilled in the art of cryptography. As will be appreciated, the typical end user sifting through a large volume of documents is unlikely to search on punctuation symbols, adjectives, adverbs, conjunctions, prepositions and the like, for example. Keyword searches are normally performed using nouns, proper nouns, particular phrases, specific numbers, special text patterns, such as, a product number in a catalogue, or the like, for example. By enabling the user to tailor filtration, the time taken to process a document image can be reduced greatly.

The objects then remaining in an object set after filtration are then grouped into a plurality of subsets, where the subsets can include one or more objects. By grouping the objects into subsets, the objects are indexed to enable the identification and management of content of interest to a user, or a plurality of users, in a relatively efficient manner.

In one embodiment of the invention, objects are grouped into the same subset based on textual values as defined by a text recognition process, such as, OCR, or the like, for example. For example, all instances of the bitmap object representing the word "hello" can be caused to appear in the same subset if they received the same character codes as output during the recognition process.

In another embodiment, objects are grouped into the same subset according to characteristics suggesting that they have the same, or similar, textual values while taking possible text recognition errors into account. For example, OCR processes can mistake an 'o' for a 'c'. Accordingly, an instance of the word "lock" might really be an instance of the word "look" but a recognition error produced the output "lock". Objects with recognition values "lock" and "look" are then grouped into the same subset.

In another embodiment, objects are grouped into the same subset if their textual values are considered to belong to some common class, such as, for example, English language prepositions, German verbs, geographical names in North America, or the like. Such a class can be defined using a specified set of requirements. For example, the user might wish to group all objects with textual metadata values matching one or more entries in a specified list of text strings. In another example, a subset can include all objects with the same length of text string as output by a recognition method and where the first character is an uppercase one, for example.

In yet another embodiment, objects are grouped into the same subset if they have similar bitmap appearances, regardless of any recognition interpretation thereof, where the similarity is determined using a matching threshold appropriate for comparing two objects. For example, two bitmap objects of the words "band" and "hand" can be compared using a pixel-pairing binary XOR measure to determine how similar the two bitmaps are. If the number of pixel mismatching is below a predetermined threshold, a 'match' can be declared, and the two objects can then be grouped into the same subset.

In yet another embodiment, objects are grouped into the same subset if their bitmaps produce similar 'features'. Features of bitmaps can be attributes, or characteristics, derived from the bitmap images. For example, a Fourier Transform of a digital image can output values, which can be taken as attributes, or characteristics, of the image. Two digital images producing the same, or similar, values, or transforms, can then be taken to be the same, or similar, without having to match each of their pixels with one another.

To enable managing of object subsets, the invention provides, in some embodiments, the linking of reference objects to associated subsets for each subset of a plurality of subsets. In some embodiments, a reference object for a subset is selected from objects from within that subset. In other embodiments, reference objects are constructed using two or more objects from within an associated subset. For example, the average bitmap shape of bitmap objects in a subset, can be used as a bitmap reference object for that subset.

Reference objects can then be displayed so as to indicate to a user what the content of each subset is, without displaying all objects in the subset. Displaying the reference objects enables feedback to be performed by the user in a more efficient way than displaying all the objects in each subset. Furthermore, machine-readable data structures are created, which data structures link the reference objects with metadata fields. In consequence, the objects in the subsets are also linked to the metadata fields for their associated reference objects. This enables actions on the metadata of the reference object to be applied automatically to the objects within the associated subset, thereby speeding up user interaction operations, for example.

In some embodiments, two or more subsets can be linked together with metadata to indicate a relationship between the linked subsets. Such links can be used in comparing objects when a user searches the index, as will be described in greater detail below. For example, a 'similarity link' can indicate that member objects within two subsets have equal, or are similar within some threshold, metadata values. Accordingly, for example, a subset of character objects 'h' can be linked as 'similar in shape' to a subset of character objects 'b', a subset of word objects "hand", appearing in bold font in the document image, can be linked to a subset of objects "hand", appearing in italics font in the document image, since both subsets include objects sharing the same textual value even though their typeset shapes differ.

Furthermore, such metadata links can be defined between one or more objects within a subset. In addition, such metadata links can be defined between objects from different subsets. For example, a subset of instances of the word object "hand" may include instances appearing in bold as well as in italics font within the document image. The italics instances within the subset can then be linked by means of metadata to italics instances in another subset.

After the subsets have been formed, in some embodiments, the method of the invention includes assigning information to the metadata of each subset, so as to identify that subset from the document image using an object of the subset as input from the document image. Such metadata enables accessing of the subset by way of the document image. For example, the user can specify an object in the document image using an interactive pointing device, such as, a computer mouse, or the like, for example, so as to locate the subset containing that specified object.

Similarly, metadata can be used to identify the locations of objects in an associated document image from the subset. This can be achieved by storing the actual locations of the objects. For example, this enables a user to draw a rectangle around a region of the document image when displayed, with a computer mouse, or the like, for example, so as to specify an image region within which all image objects can be identified using the co-ordinates of the rectangle and the page layout co-ordinates of the objects.

In some embodiments, the method includes accepting input from the user to interactively control, or tailor, the metadata values assigned to objects in the subsets. This enables a user to correct text recognition errors, which may have occurred when the initial metadata values were assigned to the objects. In this way, a user is enabled to perform error correction only on objects of interest to the user, thereby avoiding the need to perform error correction on the entire document image. Metadata assignment includes enabling the user to supply a textual value independently of whether a recognition method was used to assign an initial value. For example, the user might wish to annotate a bitmap object within the document image, where the object represents a hand-written signature on an original paper document, or the like, for example. The user is also able to define new objects, such as, by selecting a region of the document image with a computer mouse, or the like, for example, to which metadata values can be assigned. For example, the user may choose to annotate a region of the document image with a personal comment.

In another embodiment, the data structure can be displayed to the user in a tabular form. The table can include a set of entries that correspond to respective subsets of objects within an associated set of objects. The set of entries can include the representative objects for the respective subsets, as well as fields for metadata. In the presentation of the table, the representative image objects can be ordered according to user criteria, such as by arranging the display of the representative image objects in accordance with the user's preference. For example, the user can cause the representative objects to be displayed such that representative objects having textual values corresponding to English language proper nouns be displayed first. Such ordering enables the user to tailor the presentation of the representative objects so as to enable, for example, quicker identification of certain content. Accordingly, a priority can be assigned to objects by means of their associated metadata.

Furthermore, tabular presentation of reference objects enables a user to specify interactively and relatively quickly, the content, which is no longer of interest. For example, the user can click on objects within the table using a computer mouse, or the like, and then issue a command by pressing a key on a computer keyboard device, or the like, such that the objects and their associated subsets are excluded from further processing. If additional regions of the document image are processed, the index construction process can therefore be caused to ignore any objects within those regions if their metadata meets some user specified criterion. For example, later objects can be excluded if their text recognition value matches a value in a list of values to be ignored. In some embodiments, the list can include metadata associated with objects deleted from the index by a user in a way as described earlier in this paragraph.

An embodiment of the invention can include a provision for a User Index, which defines zero or more objects of particular interest to a user. As with the main index, objects in the User Index are grouped into subsets for management purposes. Furthermore, subsets can be grouped into a plurality of sets, each set having linked metadata fields. The User Index sets can contain instance objects, associated subsets and reference objects identifying the subsets. It will be appreciated that further abstraction can be provided for, such as, to group such sets under larger sets, each larger set being linked with metadata fields. For example, in the main index there can be a reference object "carrot" with 12 instance objects in its subset, reference object "lettuce" with 5 instances, and reference object "apple pie" with 8 instances. The user can then form an entry in the User Index by defining a set with a linked metadata value of "vegetable" which includes the reference object "tomato" and 2 instances of the object "lettuce". The user can define another set containing reference object "apple pie" and can assign a metadata value of "dessert". The user can then includes the "vegetable" and "dessert" sets in a new larger set with metadata value "food".

A practical application of the User Index provides the ability to group and manage document image content relatively easily. The nested abstraction using sets can be implemented with methods intuitive to a user, for example, a 'tree' hierarchy can be used to show file system contents in most modern desktop computer displays.

Conveniently, the User Index can be displayed independently of the main index display. In one embodiment, the User Index can be presented in a tabular format. Independent display and management of the User Index can provide an efficient interface in a computer implementation of the present invention, since the User Index provides to the user a filtered view of the overall index, which is in turn known to present a filtered view of the document image.

In some embodiments, the method can further include generating a searchable data structure to represent the document image. The searchable data structure can include the metadata linked to the set of image objects, and the set of image objects. For example, the user may wish to produce output files in Adobe™ PDF™ format within which are encoded the metadata values from specified subsets so that an external application, such as Adobe™ Acrobat Reader™, can be used to search the files for content.

In other embodiments, the user can select an image region and have a text recognition process provide a full-text output for that region. For example, the user can use the index of filtered image objects to find and bookmark, or tag, content of interest and use the text recognition to assist in 'copying' a region of text from within the document image to another application, such as, an e-mail message, or the like, for example. In this way, a full text region can be produced relatively easily after, for example, content from the region was excluded in the index through filtration. In some embodiments, such text can be combined with indexed metadata when producing an output file.

The invention extends to an apparatus, or system, which includes a data processing system having a user input device, a display, memory, and processing resources, to perform the functions outlined above. In some embodiments, the data processing system can be linked via a communication arrangement to a plurality of workstations at each of which a user can work interactively on the content identification and tagging process. Other aspects and advantages of the present invention will now be described with reference to the accompanying diagrammatic drawings.

The following description is presented to enable a person skilled in the art to make and to use the invention, and is provided in the context of a particular application and its requirements. Various modifications to the disclosed embodiments will be readily apparent to those skilled in the art, and the general principles defined herein may be applied to other embodiments and applications without departing from the spirit and scope of the invention. Thus, the present invention is not intended to be limited to the embodiments disclosed, but is to be accorded the widest scope consistent with the principles and features disclosed herein.

Figure 1:
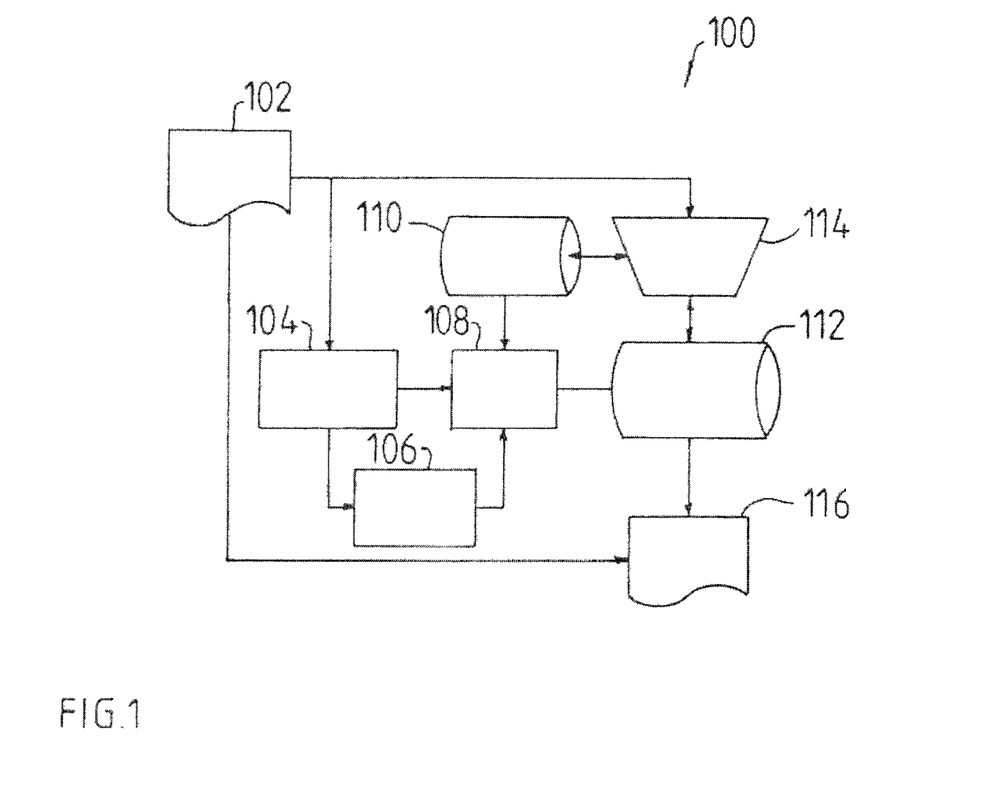
FIG. 1 shows a schematic diagram indicating a method arranged to process document images, in accordance with an embodiment of the invention.

With reference to FIG. 1 of the drawings, an embodiment of a method of retrieving information from a digital image, in accordance with an embodiment of the invention, is generally indicated by reference numeral 100. In the method 100 a document image, or document images are received as input at 102.

The document image can be in the form of a machine-readable file. The machine-readable file can include a bit mapped representation of a document. Instead, the image can include a plurality of machine-readable files, which include successive bit mapped representations of documents. The document image can be viewed and content of interest to a user can be tagged and managed by a desktop computer device, for example.

After the document image is received as input at 102, the document image is segmented at 104 to identify a set of image objects. Examples of image objects include textual characters, textual words, lines of text, drawings, logos, photographs, noise artefacts, and the like, for example. Initial Metadata is then assigned to each image object after segmentation, where appropriate, by means of an appropriate recognition process, as indicated at 106. In the case of noise artefacts, for example, such noise artefacts can be unrecognisable depending on the recognition process used. An example of an appropriate recognition process is an OCR process.

The segmented objects and their initial metadata are then input to an index manager, as indicated at 108. The index manager creates a machine-readable data structure which pairs image objects with associated metadata fields, as indicated at 112. The index manager is arranged to support searching operations on the document image.

An important aspect of the invention is the provision of content filtering which is arranged to enable a tailored, or content-filtered, index to be provided. Access to a content-filtered index and the document image enables an end user to identify, tag, and manage, content of interest, without having to produce and ground-truth a complete index of the document image.

Accordingly, the method 100 includes a content filtering step, as indicated at 110. The filtering step 110 enables a user to identify content to be excluded from the index so that further processing is performed only on information, which may be of interest to the user. Examples of excluded content can include punctuation symbols, a list of common words in the English language, such as the, and, of, and the like, for example. This enables a size of the index to be reduced, so as to enable a faster construction of the index in computer readable form. In addition, content filtering enables a user-specified index to be produced, which index includes only content of interest. In this way, the method of the invention provides a relatively computationally friendly and space efficient method.

Interaction with a user is enabled at 114. Accordingly, the user is enabled to search and manage the index data structure, as well as view the document image. In so doing, the user can identify content in the document image of interest and can assign appropriate metadata to image objects associated with the content of interest. Examples of such assigned metadata can include text annotations, hyperlinks to other metadata, alterations to metadata assigned during the recognition process at 106, and the like, thr example. User interface for interaction at 114 can include operations for managing, or tailoring, the image objects, their associated metadata, the index, and the filtering step at 110.

In some embodiments, the method 100 includes the output of a searchable image file, or data structure, which includes the document image as well as searchable content of interest, in a computer readable form, as indicated at 116. For example, an electronic file in the Adobe™ PDF™ format can be produced from the document image together with metadata associated with one or more objects, as tailored, or defined, by a user. Typically, such a file is arranged to enable users to view and search the document image for the associated metadata.

Another important aspect of the method of the invention, is the provision of an interactive feedback loop operatively connecting the steps 108, 112, 114, 110. Typically, interaction at 114 not only enables content, such as common words in the English language, to be filtered out, but, in addition, enables exclusion of content already segmented and indexed to be excluded during future processing of documents. The content can be in the form of an image object. Instead, the content can be in the form of an entire page, or multiple pages. For example, the document image can include page images from multiple files. After construction of an index for a number of pages, the user can decide that a particular page, which has been processed and viewed, is of no further interest. This can be achieved since the method of the invention enables the user to access the index and metadata during index construction. Interaction at 114 enables commands to delete content from the index. For example, the user can select a page from the document image and then instruct that that page be deleted from the data structure. Such deletion typically includes removal of any objects associated with that page, and their associated metadata, which may be stored in the index.

The feedback loop enables tailored indexes to be constructed based on distinct user specified image objects. This enables relatively smaller and faster indexes to be constructed in practice. The feedback loop enables an 'online' approach to image capturing. For example, a secretary can scan documents into a system at a copier machine, or scanner, or the like, for example, so as to perform digital imaging of paper documents. The method 100 can then be used to index document images. It will be appreciated that indexing of a document image derived from initial pages of a document being scanned can be proceeded with before scanning of the entire document has been completed. Accordingly, an attorney, for example, can interact with an index and a document image without having to wait for a third party, such as a service bureau, or the like, to produce a general purpose, full-text metafile of the image. This permits the attorney faster access to relevant content in the image. Furthermore, the attorney can observe that some of the pages thus indexed are of no interest, including certain objects. The method enables the attorney to update the content filter so as to exclude objects thus identified. When the secretary then scans in more documents, or pages, associated with the case at hand, the updated content filter causes the index to be smaller than would have been the case had a feedback loop not been employed prior to the later pages being scanned and indexed.

Figure 2:
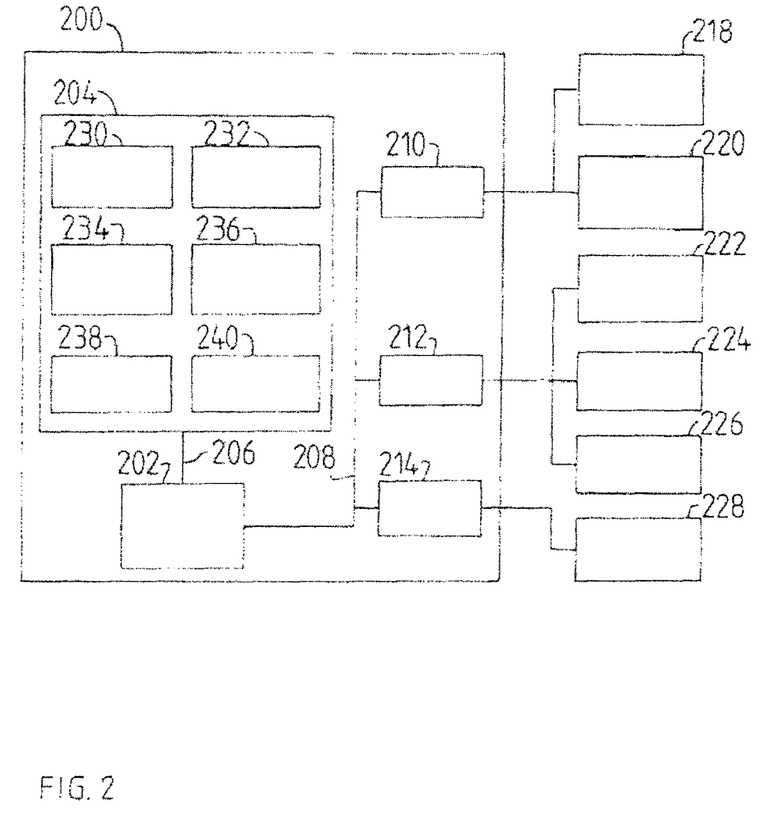
FIG. 2 shows a schematic diagram indicating a computer system, in accordance with an embodiment of the invention, arranged to enable the method indicated in FIG. 1.

Referring to FIG. 2 of the drawings, in accordance with another aspect of the invention, a system, or apparatus, appropriate for enabling the method of the invention is shown. Typically, the apparatus is in the form of a computer system generally indicated by reference numeral 200. The computer system 200 can be defined by a conventional personal computer (PC). The computer system 200 includes a processor 202. The processor 202 can be in the form of any appropriate type, such as a microprocessor, dedicated logic, a digital signal processor, a programmable gate array, a neural network, a combination of processors, or the like, for example. The processor 202 is operatively connected to memory 204, by means of a memory bus 206, or the like, for example. The memory 204 can be in the form of any appropriate memory, such as, for example, Random Access Memory (RAM), flash memory, magnetic storage media, such as hard disks, optical media, such as compact discs, or the like. The memory 204 can include a combination of the previously mentioned types of memory. The processor 202 is operatively connected to an output interface unit 210, an input interface unit 212, and a network interface unit 214, by means of data buses 208, or the like, for example. The interface units 210, 212, 214 are arranged operatively to connect the processor 202 with various input and output devices, and a broader network of computing components.

A display 218, such as a computer monitor, or the like, for example, and printer 220 are used to render document images. Examples of devices commonly used to provide digital images, indicated at 222, include optical scanners, charge coupled devices (CCD), image renderers, and the like, for example. Such devices can be used to produce bitmapped images of documents. Typically, an optical scanner captures images of tangible documents, such as paper documents, or the like, for example, into bitmap raster form. CCD's are typically used in devices such as, digital cameras, and the like, for example. Image renderers are typically used within printer drivers in order to produce a bitmap image from a given input, such as, a word processor file, or the like, for example, by using font and page layout information. Accordingly, the input devices 222 enable conversion of content information from paper and electronic documents, into bit-mapped images. A keyboard 224 is provided, to enable commands to be input by a user. A computer mouse 226 is provided to enable contextual interaction with a user. A network 228 permits expansion of the system 200 to include more devices, such as, remote scanning and data storage devices, and the like, for example. The system 200 is arranged to enable interaction with a plurality of users by means of a network. Such a network can include components and protocols known in the art, such as, Ethernet cable and the TCP/IP packet protocol, or the like, for example.

Typically, the memory 204 includes computable logic for an index managing process, as indicated at 230, and an object recognition process, as indicated at 232. The memory 204 includes a representation of, or information associated with, one or more document images, as indicated at 234, a representation of, or information associated with, an index, as indicated at 236, for image object-metadata pairs, a representation of, or information associated with, a searchable image file, as indicated at 238, and a representation of, or information associated with, a content filter, as indicated at 240.

The method of the invention will now be described, with reference to FIGS. 3A and 3B of the drawings, which show an embodiment of the invention in greater detail.

Figure 3A:
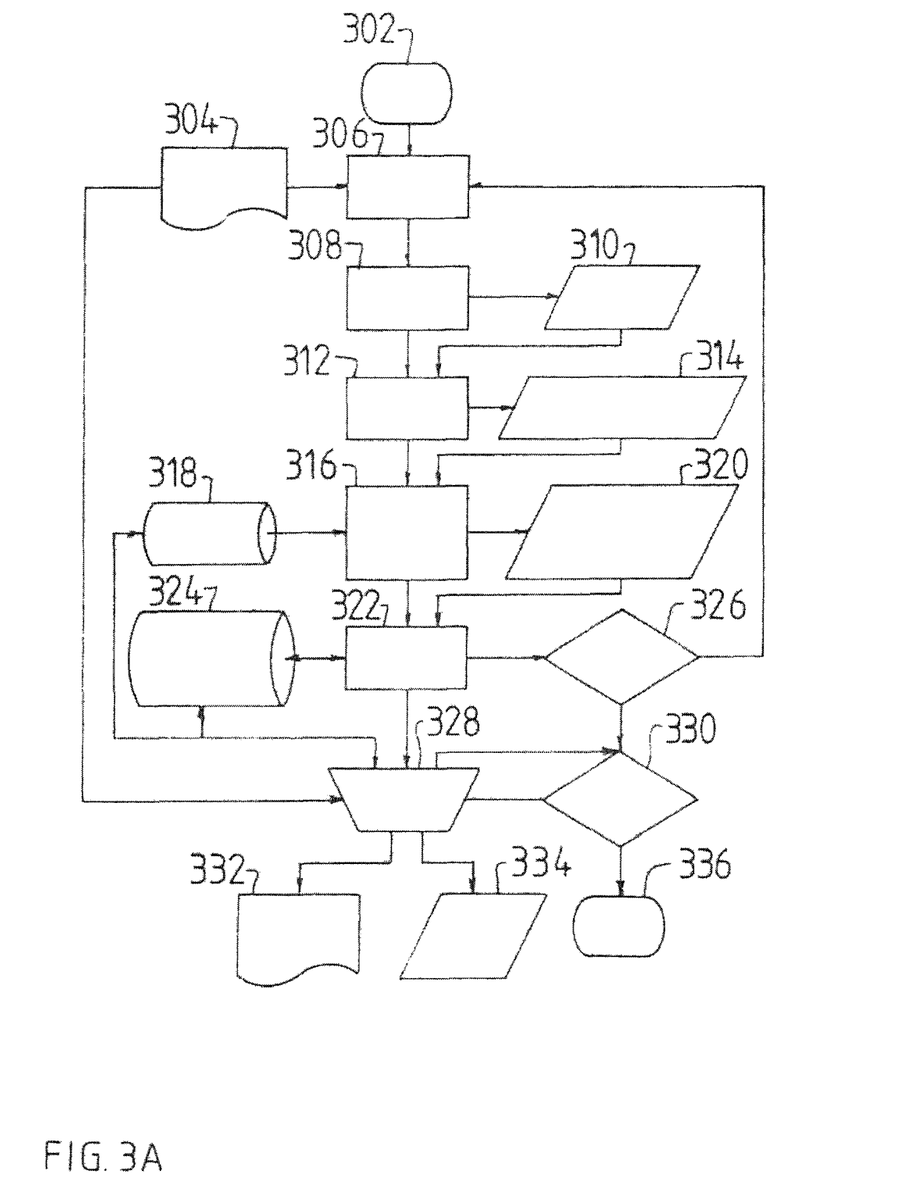
FIGS. 3A and 3B show schematic diagrams indicating steps in a method arranged to tag content in document images in accordance with an embodiment of the invention.
Figure 3B:
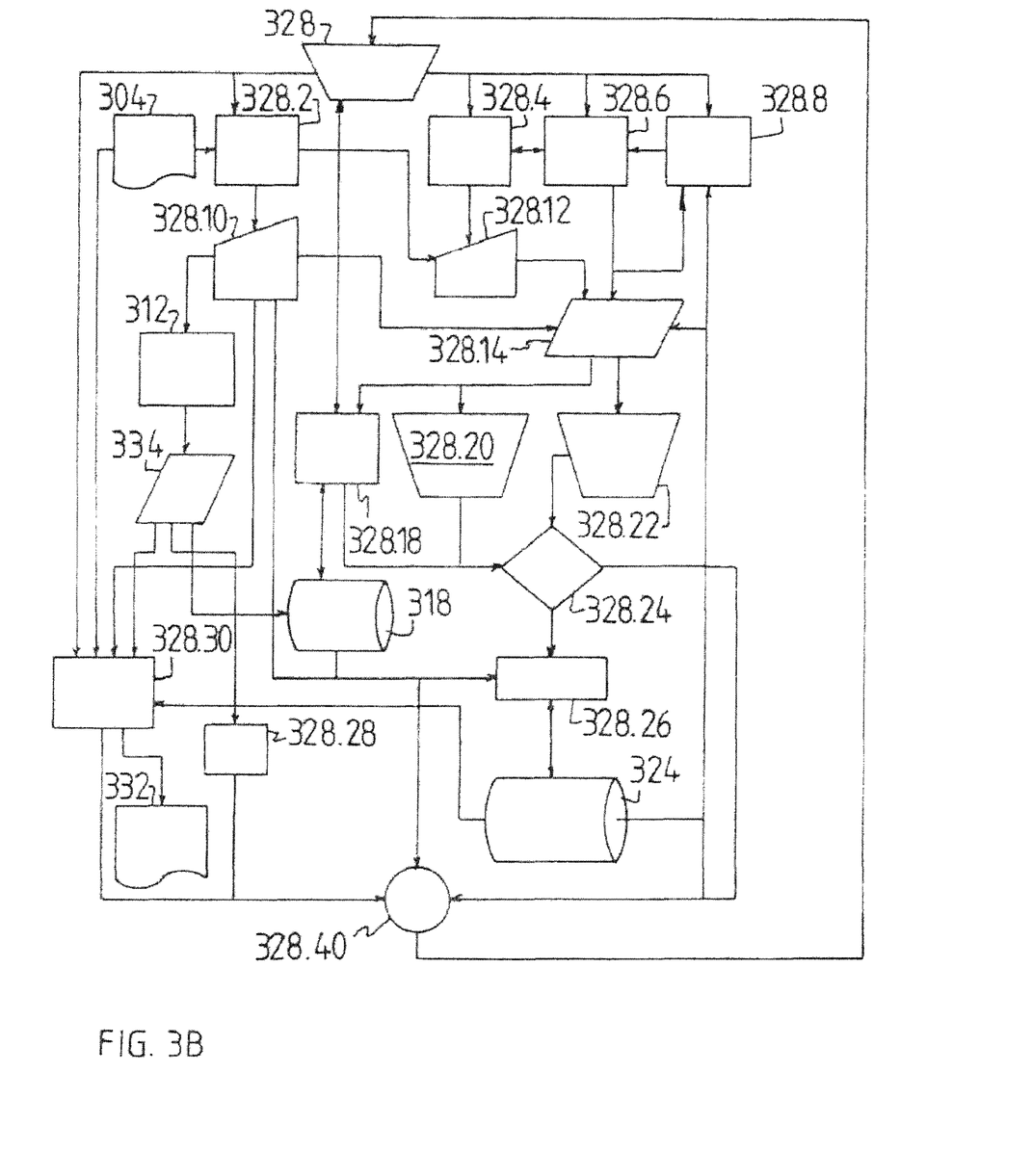

In FIG. 3A, identification and tagging of content commences at 302 with the input of a document image at 304. To input the document image at 304, devices, such as, optical scanners, software applications, which rasterize electronic documents, such as facsimile software on a desktop computer, or the like, can be used.

Typically, the document image is processed in a broken down fashion, region by region, as indicated at 306. Separate pages of a multiple page document can define such regions, for example. Instead, the regions can be smaller, such as, paragraphs, physical portions of a page, such as a top part of a page, or the like, for example. Multiple pages can define the regions. Breaking down a document into regions is desirable in following an 'online' approach to processing of the document image. Breaking down a document into regions, enables user feedback so that such feedback is taken into account in processing subsequent regions. Accordingly, user review and interaction of earlier regions can be implemented in subsequent regions. In addition, re-processing of earlier regions, which have already been processed, can be provided for.

Each region is segmented at 308 so as to identify image objects 310 in each region. Segmentation at 308 can include using an automatic algorithm. For examples of such algorithms see L. O'Gorman, The document spectrum for page layout analysis, IEEE Transactions on Pattern Analysis and Machine Intelligence, 15:1162-1173, 1993; and U.S. Pat. No. 5,555,556.

The image objects are then input to a text recognition process at 312. The text recognition process can be in the form of an optical character recognition (OCR) process, for example. The output of the recognition process is used to create a computer readable data structure that links each object to associated metadata fields. The metadata for an object is initialised with the recognition result for the object. For example, if the image object is a bitmapped instance of the word "the" in Times Roman font, and is accurately recognised, the metadata will include the plain text value "the". The metadata assigned to an object may be a 'null' value if the object is unrecognised. Such can be the case with, for example, a noise artefact, such as a punch hole, or the like, or an object typeset in a font or language outside the scope of the recognition process, or the like.

The metadata can include additional information as output by the recognition process. For example, a confidence value as generated by an OCR process. In such an OCR process, such a confidence value is normally output for each bit-mapped character processed and indicates the likely degree of accuracy of the associated character code. The metadata can also include output information as to what the possible font typeface of the object might be, as output by the OCR process.

The metadata further includes the location of the object within the document image. Accordingly, a file number, where the document image comprises more than one file, a page number, an (X,Y) co-ordinate identifying, for example, the top-left position of the object on an associated page, a width and height value of a rectangular box that bounds the object on the page, and the like, can be included in the metadata.

The metadata linked to an object is initially sufficient to enable a filtration process to be performed, as indicated at 316. After the filtration step at 316, additional data can be linked to objects of interest to a user and which are to be retained. In this way, having to prepare and store extraneous data for objects that are of no interest to the user can be avoided.

Objects of no interest to the end user are then removed during filtering at 316. A data structure at 318 is then provided. The data structure at 318 then defines the content to be excluded from further processing. During filtering at 316 text strings can be compared in the linked metadata fields against a list of text strings, such as, a list of English language prepositions, a list of English language common words, and the like. If a match is found for a given object that object is then filtered out from further processing. Comparisons of textual strings can include 'fuzzy', or flexible logic, so as to compensate for possible text recognition errors.

The data structure at 318 includes metadata values attributed to objects of interest to the user. For example, the user may wish that the index exclude punctuation symbols except for the symbols '$', (dollar) ',' (comma) and '.' (period), in the event that the user wishes to search for financial figures, for example, in the document image. By enabling the user to manipulate, or tailor, the inclusion and exclusion of metadata specifications during filtering at 316, a relatively flexible and efficient way of processing document images is provided to the user.

Typically, filtering at 316 is not limited to string matching. Filtering can include comparing the recognition confidence value for an object against a user specified threshold confidence value. Accordingly, if confidence values of objects are below a user specified threshold confidence value, such objects are removed from further processing during filtering at 316.

Filtering at 316 can provide for compensating for limitations in the recognition process used. For example, a null plain text value can be assigned to an object that is part of a line drawing during the recognition process. This can occur when the recognition process is unable to recognise an object. For example, an OCR engine used in the recognition process can output a text value for an object within a non-textual region of a page, such as, in the case of a diagram, or the like, for example, even though that object is not textual. By enabling a user to set a size limit on objects so that objects of bitmap dimensions outside an acceptable size range are removed from further processing, such limitations in the recognition process can be compensated for. Heuristics for text layout can therefore be used to filter out objects for which recognition results are generated, possibly with high confidence values, yet where the layout of such objects is outside expected and specified parameters.

Filtering at 316 can include the use of grammatical and textual layout analysis in order to assist in classifying and thus filtering textual objects more accurately. For example, the English word "US" might be the common English pronoun "us" written in uppercase letters, or it could be a two-letter abbreviation for "United States". If common pronouns are being filtered out, it may be undesirable to filter out abbreviations for country names, as they might be significant to the user. Analysis of a textual object's metadata, and the data for surrounding objects nearby in the document image, can be used to produce a grammatical interpretation of the object beyond the simple use of text recognition values. The interpretation can also be reflected in the metadata assigned to an object that is not filtered out. For example, in displaying a list of objects to the user, grammatically common textual objects might be shown after uncommon objects.

Furthermore, filtering at 316 can be arranged to filter beyond textual space. Image shape analysis can also be included, for example. Font resources can be used to render bitmap representations of textual elements as listed in the filtering process at 316. For example, methods of a printer driver can be used. These bitmaps can then be compared with objects segmented within the document image using image matching techniques, such as, pixel based binary XOR, or the like, for example. Such comparisons can be useful in situations where the recognition process was unable to obtain an accurate value for an object, such as, in cases where documents have poorly printed text, where the text has faded over time, or the like, for example. As when comparing objects for grouping into subsets, filtering can compare objects using 'features' derived from object bitmaps. For example, objects can be filtered if their Fourier Transform output values match, within some predetermined threshold, any transforms defined in a filter.

The data structure at 318 can include both static and dynamic elements. Static elements are presented to the user interactively before any part of the document image is processed. This enables the user to pre-configure, or tailor, the filtering process at 316. For example, a law firm could configure, or input, a list of words which would routinely be desired to be indexed, such as, when dealing with insolvency cases, or the like, for example, as well as a list of words which would not be of interest in such cases, for example. A user can then be prompted, for example, to select which static elements should be applied to the document image to be processed and which static elements should be removed.

A dynamic element can be used to provide for any additional metadata content to be applied during filtering at 316 as is desired by the user after the processing of one or more image regions. For example, a user can wish to specify that for subsequent regions, all punctuation must be retained, whereas all numbers can be removed. In another example, a user can specify some proper nouns for retention and a list of various English words for removal. Accordingly, a dynamic element can support an online image capture process so as to enable the user to fine-tune, or tailor, a set of image objects to be indexed.

After the filtering process at 316, a filtered set of image objects together with associated, or linked, metadata is output, as indicated at 320. The filtered set of image objects together with associated, or linked, metadata, is then used to update a computer readable data structure defining the index of image object and associated metadata pairs, as indicated at 324, which indexes the document image. Such updating is indicated at 322 by using an appropriate index managing process. Typically, the index is constructed, or updated, by a process which groups identified image objects into a plurality of subsets. Each subset then typically includes one or more image objects. Typically, at 324, a representative object is assigned to each subset within the data structure. Examples of a representative object which can be assigned to a subset include, an image object from the subset, an image object from a global set of pre-defined image objects, an image object rendered from plain text using a printer driver, an image object created, or constructed, from two or more image objects (such as a 'centroid' image), or the like, for example. Image objects within a subset are considered to be 'instances' of the representative object. Typically, index construction includes linking subsets with metadata indicating a relationship between the linked subsets, such as, a 'similarity' property, or the like, for example. Such links can also be defined between two or more instance objects within a subset, and between two or more objects from different subsets. For example, an instance of character object 'b' can be linked as 'similar in shape' to an instance of character 'h' in another subset.

Image regions are processed until the entire document image is captured, as indicated at 326. As indicated at 328, the user can continue to interact after all the regions of the document have been captured in the index. For example, the user can instruct that an image region be processed again, in a case where the user has made dynamic changes to the filtering process at 316, for example, after that image region was processed. When the user is satisfied with a resultant processed image, the process is stopped, as indicated at 330. A duly processed document image is then provided to the user, as indicated at 336.

A display device, such as a computer monitor, or the like, for example, is typically used to render an image region for the user. With reference to FIG. 3B, in which like reference numerals have been used to designate similar features, or steps, unless otherwise stated, such a process will now be described.

An image is rendered for the user as indicated at 328.2. Through a display at 328.2, the user is enabled to select an object, as indicated at 328.12. For example, the user can identify an object in the rendered image with a computer mouse 'click', or the like. In another example, the user can draw a bounding rectangle around a paragraph of text in the rendered image with, for example, a computer mouse, or the like, thereby to select a desired region of the image, as indicated at 328.10. This can cause zero or more image objects to be identified within the paragraph. It will be appreciated that if this is done after filtering, as indicated at 316 in FIG. 3A, not all objects appearing in the rendered paragraph may be selected since some of the objects could have been filtered out so as to be absent in an associated index, as indicated at 324.

Instead of using a computer mouse, selection of an image region can be achieved using commands. For example, the user can be prompted to specify one or more pages within the document image so as to define a selected region.

The user is enabled to select objects from displays of subsets, as indicated at 328.4, and reference objects, as indicated at 328.6. When selection is performed using a reference object, the instance object, or objects, in the subset associated with that reference object can be selected, as indicated at 328.14. Instead, the user can select the reference object itself.

A search interface as indicated at 328.8, enables the user to identify objects using search queries against the index at 324. The user can input a text string query so as to cause a search to return a list of zero or more objects, as indicated at 328.14. This is typically achieved by metadata linked with the objects and which include values matching the query string in accordance with a specified matching protocol. For example, the user might input the word "network#", where the '#' symbol denotes truncation, which is then matched against object metadata using a character string matching routine, in which case the search result can include objects with metadata values of "network", "networks", "networking", and the like, where such objects have been indexed. Matching of query metadata with object metadata can include 'fuzzy logic' and other methods disclosed in the art so as to assist in compensating for text recognition errors. For example, by adjusting character alignments, a word object with the text value "hand" could be compared with another object with the text value "bland" and declared similar if 'b' and 'h' are similar according to some criterion and the 'l' is ignored. The same processes as used in the filtering process at 316 in FIG. 3A for comparison can be used by means of the search interface at 328.8, when comparing search terms with metadata at the index 324.

A search query can include the metadata from one or more objects selected by a user. For example, the user can select an instance of the bitmap word object "network" in a rendered display of the document image using a computer mouse 'click', or the like, for example. The search interface can then use the metadata of the object to search for other instances of the word "network" within the document image.

Using the metadata linked to a selected object, the search interface can locate the object's subset since the metadata enables identifying a subset when given any object therein. Accordingly, by using metadata links between subsets and between objects within subsets, the search interface can locate other related objects, as defined by links between the subsets and the objects. For example, an instance of the word object "hand" might be segmented into character objects which are indexed in subsets numbered 7, 3, 4, and 8, where subset 7 indexes instances of the character 'h', subset 3 indexes instances of the character 'a', and the like, for example. Another instance of the word "hand", perhaps having a bold letter 'h', might be segmented into characters indexed in subsets numbered 5, 3, 4, and 8. The subset indices thus form patterns by which objects can be compared, in this case patterns {7, 3, 4, 8} and {5, 3, 4, 8}. If there is a 'similarity' link between subsets 7 and 5, then these two instances of object "hand" match within some predetermined tolerance used to construct the similarity link and they can then be output as part of a search for instances of the word "hand".

The search result can be a list of zero or more reference objects as indicated at 328.6. Reference objects can provide a relatively efficient way of working with instance objects within associated subsets. For example, when reviewing the reference objects returned for a given query, the user may notice a text recognition error if the reference objects are bitmaps shown to the user along with textual values, as can best be seen with reference to FIG. 4 of the drawings, and as described in greater detail below. If the associated reference object is of interest to the user, error correction can be performed. If not, the user can choose to ignore the text recognition error. Such an error may have slipped through the filtering process, perhaps because the user did not specify a strict enough filtering process, or because the user has chosen to ignore such objects not of interest within the index. In this way, ground truthing only objects of interest to the user can avoid ground truthing of a full text of a document.

Objects selected at 328.14 can then be processed further. The user can review and edit the metadata linked to an object, as indicated at 328.20. For example, the user can correct an erroneous text recognition value of an object. The user can assign metadata to an object. For example, an object may be a bitmap picture of a handwritten signature to which the user can assign metadata to identify the signature.

The user can edit the objects as indicated at 328.22. For example, the segmentation process at 308 could have incorrectly segmented an object within an image region. The user can interact to redefine such an object. For example, the user can draw a rectangle on a display of an image region using a computer mouse, or the like, so as to redefine a geometric boundary of an object which can then be added to the index and have metadata assigned to it. Further editing abilities include the ability to delete an object and its associated metadata from the index. If no edits, or changes, are desired, as indicated at 328.24, a "continue?" option can be provided, as indicated at 328.40. If the user wishes to continue, the user can be returned to user interaction at 328.

The user can create, or construct, a User Index. The user can include a subset of the main index of object-metadata pairs, which subset can contain pairs of particular interest to the user. As described above, the subsets of objects can themselves be grouped. However, the user can also add additional metadata to the index. For example, the user can define a 'null' object and assign metadata to it. Such metadata can be used to manage objects, subsets, or groups of subsets within the User Index, without having to refer to an object within the document image, or within the main index. The user can allocate a title name to a set of objects. The user can assign a link from within the User Index to some information external to the index, such as, a link to a document on a website, or the like, for example.

Figure 4:
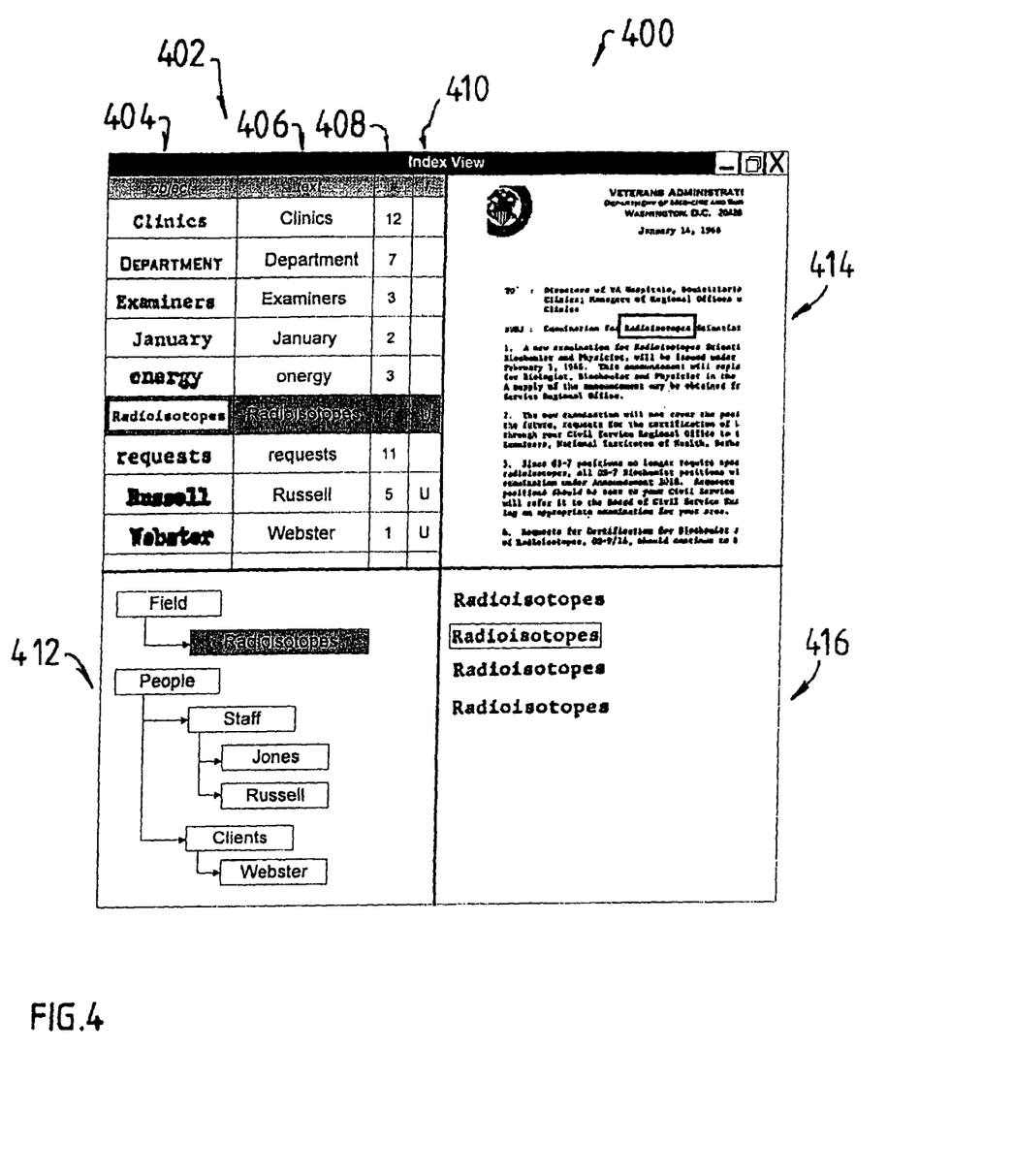
FIG. 4 shows a schematic diagram indicating an example of a displayed image showing a portion of an index, a portion of a User Index, and a selected object, with some of its instances, including a region of an associated document image showing a selected instance.

The User Index can be created by flagging within the main index. For example, a 'user' flag can be set to 'true' if the associated object is to be included in the User Index as well as the main index. A 'hidden' flag can be set to true if an object is not to be shown in a display of either index, thereby enabling the user to set up a streamlined display of the associated index. The streamlined display can be presented in a tabular display of the indexed objects, as indicated in FIG. 4 of the drawings, and as will be described in greater detail below. If an object is to be included in the User Index, but not in the main index, a 'user-only' flag can be used, for example. Other flags can be used to specify an ordering of objects in the User and main indexes. For example, when the index contents are displayed in a tabular format, such flags can be used to order the objects as displayed so that objects of greater interest are displayed above objects of lesser interest. To amend such flagging, the user can reverse, or undo, edit operations on the metadata, or the reversal can be achieved simply by changing flag values, for example.

An online model of image processing enables the user to create entries in the User Index after initial regions of a document have been processed and before subsequent regions of the document are processed. Accordingly, entries, or subsets, can be created in the index while a document is busy being processed so as to enable objects identified during subsequent processing to be allocated to associated subsets formed earlier. For example, the user can set up an entry, which includes a link to a subset of instances of the word "computer". At the time the entry is made, the index can have 25 instances, for example, of this object within an associated subset. As more image regions are processed, perhaps while the user is away from his computer and an assistant is feeding more pages into a scanning device, or the like, additional instances of the object "computer" can be located and caused automatically to appear in the User Index within the associated subset. When the user returns later to inspect the User Index entry, for example, there can then be 50 instances, for example, of the object within the associated subset. In another example, the user can decide, before any image regions are processed, to set up a User Index entry. Such a User Index entry can include defining a subset arranged to link a specific class of objects, such as, people's names, states of a country, or the like, for example, to that subset. Grammatical metadata for objects, such as words starting with capital letters, for example, can be used to cause objects, which match such metadata, to be linked to a specific subset as the document is processed.

An image region can be selected at 328.10 which can then be input to the text recognition process 312 so as to produce unaltered text, as indicated at 334. Accordingly, the user can extract and 'export', as indicated at 328.28, unfiltered text of an image region after such text has been filtered at 316 during index construction. For example, filtering can be arranged to remove all punctuation symbols from the index, the user can then 'copy-and-paste' unaltered text, as indicated at 334, into an e-mail message with such punctuation included.

The unaltered text, as indicated at 334, can be used to construct, or create, a searchable image file, as indicated at 332, using a process at 328.30. The process at 328.30 can use a searchable image file in PDF format, for example, output from an OCR application such as Adobe™ Acrobat™ Capture™, The searchable image file need not necessarily contain plain text, as indicated at 334. For example, a user can create a searchable file from specified regions of the document image using specified objects within the index, and their associated metadata. This permits the user to create streamlined output files, which do not include spurious metadata content. Such files can be useful, for example, when a lawyer wishes to assemble a set of files for a particular case. By saving portions of the document image and metadata of interest, a portable set of files can be used in, for example, a court room, on a hand-held flash memory device, on a laptop computer, or the like, for example, without the lawyer having to have the entire data structure available.

By means of the invention, the user is enabled to filter content from the document image. Accordingly, user interaction at 328 enables updating of the filtering process at 318 using one or more objects 328.14 specified by the user, as indicated at 328.18. Such updates can include the ability to change the filtering for any subsequent image regions to be processed. For example, the user may wish to update the filter to exclude metadata assigned to a range of objects as selected from the index. This permits the user to identify content of no interest in an existing index and to change the filtering so that content of such no interest is not indexed from subsequent image regions still to be processed. Existing objects already indexed can be removed from the index, if desired. The user can be enabled to separate filter updates from index updates. In this way, different filtering parameters can be set for different portions of a document being processed. Accordingly, removal of an object from the index can be achieved without updating filtering and filtering can be changed to remove objects while retaining those objects in the index. The user can then select multiple pages within the document index and have any objects, which have been indexed for those pages, removed, while adding their associated metadata to the filtering.

Accordingly, the user can update filtering either through direct object selection or through image region selection. The user can adjust the filtering directly. For example, the user can add new metadata to the filtering, or adjust an existing setting. In addition, the filtering can be updated using text from extracted plain, or unaltered text, as indicated at 334. For example, the user can select a region of the document image and use the output of the text recognition to set up text for use in adjustment of the filtering. This can save the user the trouble of having to type in metadata values. The user can edit the unaltered text before the filtering is updated. For example, the user can choose to use a subset of the unaltered text extracted from the image and the user can correct any text recognition errors in the unaltered text, as indicated at 334.

The index can be updated, as indicated at 328.26, by user interaction. Such updating can include the removal of objects already in the index in response to modifications to the filtering. Such updating can also include automatic operations in response to changes performed by the user when editing objects and their metadata. For example, if objects are grouped in subsets based on equal plain text metadata values, and the user changes an instance object's plain text value, the update can include automatically moving the instance object to another subset based on the new value. Furthermore, such updating can include manual editing of metadata links between subsets and between objects within subsets. For example, a user may wish to remove a 'similarity link' between two subsets if the link is causing spurious search results, or the like, when the user queries the index.

In an 'online' embodiment of the present invention, alterations to the filtering can be applied in re-processing regions already processed, for indexing purposes, or the like, for example. The user can specify any such regions. In some computer systems, there can be sufficient memory resources to cache a complete output, as indicated at 314 in FIG. 3A, of the selected image regions, in which case re-processing can be achieved relatively quickly without having to redo text recognition. Such cached results can be used in performing text recognition on a selected region at 328.10.

The resultant index 324, after processing is completed, can be used as a data structure across more than one computer application. Data from within the index can be exported, or linked, to other applications. For example, metadata can be copied into a relational database product for publication to other users. In another example, metadata can be copied into e-mail messages. Client-server systems can be built to share the index across a range of applications, such as, in an office having multiple users across a corporate network of computing devices, for example. Accordingly, user interaction at 328 can be implemented using more than one interface. For example, multiple users can interact with the index simultaneously using computer workstations networked to a shared memory, for example.

In FIG. 4 of the drawings, an example of an image presented on a display, which can be used by a user to interact with the data structure, is generally indicated by reference numeral 400. The display image can use window panes commonly found in the graphical displays of desktop computer systems.

An upper left windowpane 402 shows a portion of the index displayed in the form of a table. The portion of the index is arranged in rows where each row in the table shows, from left to right, a reference object 404 in bitmap form as the object appears in the document image, a corresponding plain text value 406 (possibly edited by a user), a counter 408 showing the total number of instances of objects within the associated subset, and some 'flag' information 410, such as, for example, a 'U' to indicate that the object is listed in the User Index. In this example, the object "energy" has an erroneous text recognition output of "onergy", which the user can ignore, for example, if the object and its subset are not of interest. In addition to index browsing, this type of display can be used to show 'search results' when the user runs a query against the index, in which case the table rows could contain information output by a search algorithm. The rows can also be ordered to reflect user preferences, such as, by showing grammatically common words, as flagged in object metadata values, lower down in the table. In another example, words with a stronger match to a search query might be shown first.

The lower left windowpane 412 shows a portion of the User Index. Conveniently, items are shown in a 'tree' hierarchy form, where the tokens in the tree are the textual values from the index. An item has been selected by the user and is shown in highlighted fashion. The item can be selected in any appropriate way, such as, by clicking on it with a computer mouse, or the like, for example. The upper left pane is rendered so as to make visible the corresponding subset within the main index. An upper right windowpane 414 shows a region of the document image containing an object of the selected subset, initially the reference object. A lower right pane 416 shows instances within the subset, including a rectangle around the object currently viewable within the document image pane 414. If the user clicks on another instance in the subset, the upper right pane 414 would then show that region of the document image corresponding to that instance. If the user clicks on a different object in the upper right pane, the index entry for that object is shown in the left panes 402, 412.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed:

1. A method of enabling a user to retrieve information from a document image, the method including:
   segmenting the document image to identify a set of image objects within the document image;
   creating machine readable data structures linking the image objects with metadata fields;
   applying an automatic algorithm to the image objects so as to assign initial metadata to the linked metadata fields;
   selecting and user filtering image objects from the set of image objects whose metadata satisfy filtration criteria specified by at least one user, wherein filtration criteria may be varied by the at least one user so as to exclude those user selected image objects from processing;
   wherein the user filtering of image objects comprises comparing user specified metadata with the linked metadata fields and filtering out image objects for which a match is found;
   processing a rest of the image objects in the set of image objects so as to group the rest of the image objects into a plurality of subsets, each subset including one or more image objects, wherein the processing is performed subsequent to the user filtering the image objects;
   presenting the document image, image objects, and metadata to the at least one user; and
   enabling input from the at least one user so as to manage the image objects, subsets, and metadata.

2. The method of enabling a user to retrieve information from a document image as claimed in claim 1, which further includes linking reference image objects to corresponding subsets in the plurality of subsets.

3. The method of enabling a user to retrieve information from a document image as claimed in claim 2, in which linking reference image objects to corresponding subsets in the plurality of subsets includes selecting image objects from the corresponding subsets to define reference image objects corresponding to the subsets.

4. The method of enabling a user to retrieve information from a document image as claimed in claim 2, in which presenting the document image, image objects, and metadata to the at least one user includes presenting the reference image objects to the at least one user.

5. The method of enabling a user to retrieve information from a document image as claimed in claim 1, which further includes generating a searchable data structure to represent the document image.

6. The method of enabling a user to retrieve information from a document image as claimed in claim 1, in which applying an automatic algorithm to the image objects so as to assign initial metadata to the linked metadata fields includes applying an automatic algorithm in a form of a text recognition algorithm to the image objects so as to assign initial metadata to the linked metadata fields.

7. The method enabling a user to retrieve information from a document image as claimed in claim 1, in which enabling input from the at least one user so as to manage the image objects, subsets, and metadata includes enabling the at least one user to vary filtration criteria.

8. The method of enabling a user to retrieve information from a document image as claimed in claim 1, in which enabling input from the at least one user so as to manage the image objects, subsets, and metadata includes enabling the at least one user to vary the initial metadata assigned to the linked metadata fields.

9. The method of enabling a user to retrieve information from a document image as claimed in claim 1, in which processing a rest of the image objects in the set of image objects so as to group the rest of the image objects into a plurality of subsets includes grouping image objects having similar metadata into subsets.

10. The method of enabling a user to retrieve information from a document image as claimed in claim 1, in which presenting the document image, image objects, and metadata to the at least one user includes presenting a document image in a form of a machine-readable file including a bit mapped representation of a document.

11. A system for retrieving information from a document image, the system including a user input device, a display, a memory, a document image stored in the memory and instructions for enabling a user to retrieve information from the document image, wherein the instructions perform
   segmenting the document image to identify a set of image objects within the document image;
   creating machine readable data structures linking the image objects to metadata fields;
   assigning initial metadata to the linked metadata fields by means of an automatic algorithm;
   selecting and user filtering image objects from the set of image objects whose metadata satisfy filtration criteria as specified by a user, wherein filtration criteria may be varied by the user so as to exclude such user selected image objects from processing;
   wherein the user filtering of image objects comprises comparing user specified metadata with the linked metadata fields and filtering out image objects for which a match is found;
   processing a rest of the image objects in the set of image objects so as to group the rest of the image objects into a plurality of subsets, each subset including one or more image objects, wherein the processing is performed subsequent to the user filtering the image objects;
   presenting the document image, image objects, and metadata on the display; and
   enabling input by means of the user input device so as to manage the image objects, subsets, and metadata.

12. The system for retrieving information from a document image as claimed in claim 11, which includes instructions for linking reference image objects to corresponding subsets in the plurality of subsets.

13. The system for retrieving information from a document image as claimed in claim 12, which includes instructions for linking reference image objects in a form of image objects selected from the subsets to corresponding subsets to define reference image objects corresponding to the subsets.

14. The system for retrieving information from a document image as claimed in claim 12, in which the instructions for presenting the document image, image objects, and metadata on the display includes instructions for presenting the reference image objects on the display.

15. The system for retrieving information from a document image as claimed in claim 11, in which the instructions further include instructions for generating a searchable data structure representing the document image.

16. The system for retrieving information from a document image as claimed in claim 11, in which the instructions for assigning initial metadata to each image object by means of an automatic algorithm includes instructions for assigning initial metadata to each image object by means of a text recognition algorithm.

17. The system for retrieving information from a document image as claimed in claim 11, in which the instructions for enabling input by means of the user input device so as to manage the image objects, subsets, and metadata includes instructions for enabling a user to vary filtration criteria by means of the user input device.

18. The system for retrieving information from a document image as claimed in claim 11, in which the instructions for enabling input by means of the user input device so as to manage the image objects, subsets, and metadata includes instructions for enabling a user to vary the initial metadata assigned to the linked metadata fields by means of the user input device.

19. The system for retrieving information from a document image as claimed in claim 11, in which the instructions for processing a rest of the image objects in the set of image objects so as to group the rest of the image objects into a plurality of subsets, each subset including one or more image objects includes instructions for grouping image objects having similar bitmap shapes into subsets.

20. The system for retrieving information from a document image as claimed in claim 11, in which the instructions for presenting the document image, image objects, and metadata on the display includes instructions for presenting a document image in a form of a machine-readable file including a bit mapped representation of a document on the display.

* * * * *